Patented July 23, 1929.

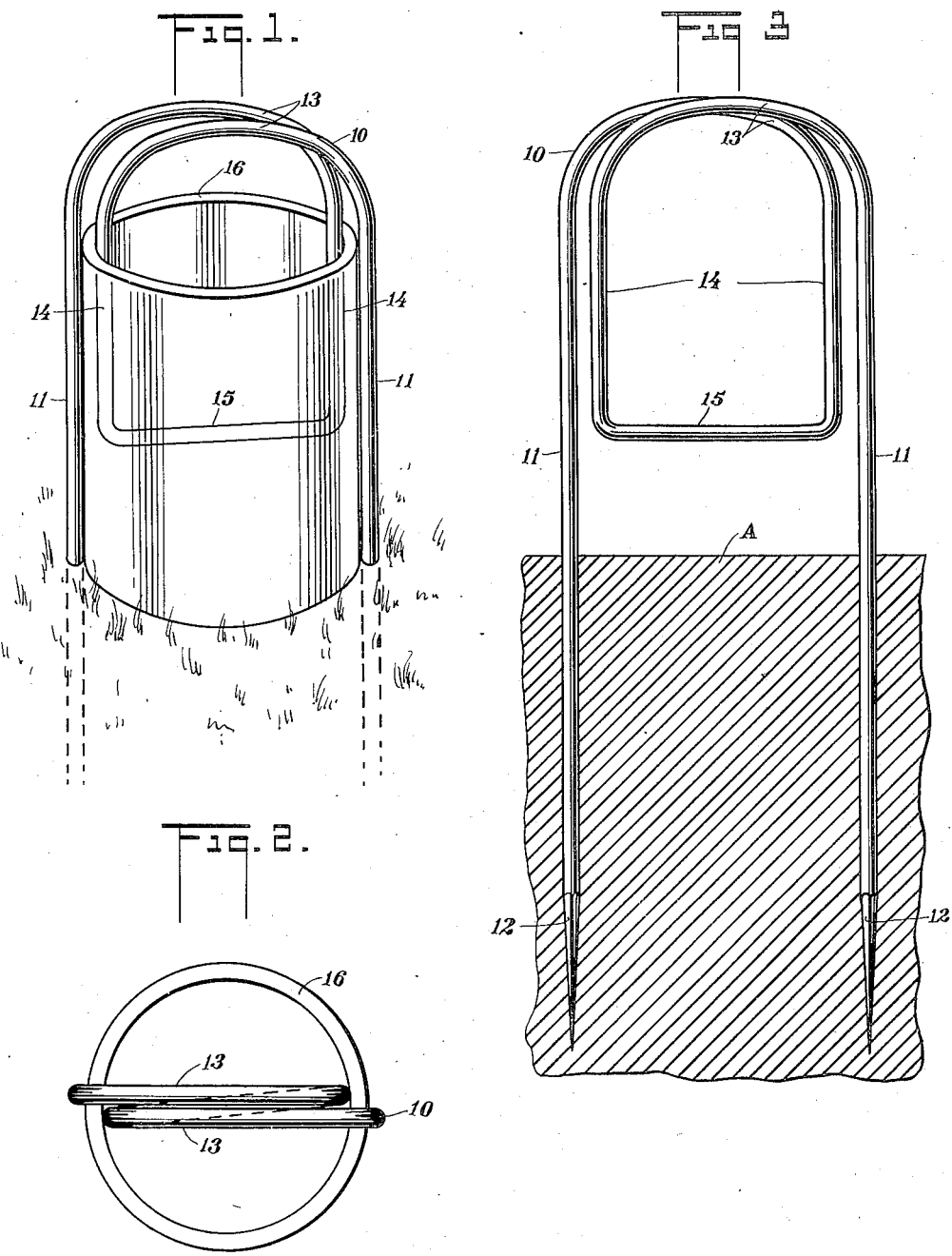

1,722,197

UNITED STATES PATENT OFFICE.

WILLIAM HATHEWAY CARNOE, OF TIVERTON, RHODE ISLAND.

CUP VASE AND SPRAY HOLDER.

Application filed February 13, 1928. Serial No. 254,111.

My invention relates to a device for use preferably in cemeteries to hold flowers and sprays on a grave, the device including a cup vase of metal, glass or other suitable material, to be utilized in association with an element of wire or its equivalent to hold a flower or spray placed in the vase in the summer, and capable of use alone for holding a spray of holly or the like in the fall and winter.

The general object of my invention is to provide a device of the indicated character of simple construction and effective in use, the wire element adapted to be driven into the ground to hold the device in proper position for the display of the flower or spray.

The nature of my invention and its distinguishing features and advantages will clearly appear as the description proceeds. Reference is to be had to the accompanying drawings forming a part of this specification, it being understood that the drawings are merely illustrative of one example of the invention.

Figure 1 is a perspective view of a combined cup vase and spray holder embodying my invention;

Figure 2 is a plan view thereof;

Figure 3 is a side elevation of a wire element of the device without the cup showing the element driven into the ground.

In carrying out my invention in accordance with the illustrated example, an element designated generally by the numeral 10 and formed of a length of wire or rod is formed with two side legs 11, the terminals 12 of which are pointed and adapted to be readily driven into the ground, as on a grave.

The material forming the element 10 is brought from the opposite legs 11 across the top in arched form, as indicated at 13, and from said arched top 13 the material is brought down at opposite sides to form vertical members 14 united at their lower ends by the cross bar 15.

The cross bar 15 is adapted to be inserted in a cup 16 to constitute a vase or pot, as shown in Figures 1 and 2, so that the vase may seat on the ground.

The cup 16 is utilized particularly in summer time for holding a flower or spray, and the cup may be filled with water to prolong the life of the flower. The element 10 may be used independently of the vase, as shown in Figure 3, by driving the side legs 11 into the ground. The spray is held between the arched members 13, the material being more or less resilient. Thus a flower or spray may be held in position for proper display. In winter holly or the like may be held between the arched members 13.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. A device of the class described including a cup and an element formed of a single piece of material and having side legs adapted to be driven into the ground and adapted to be disposed outside of the cup, the material of said element extending from the upper ends of said legs in opposite directions transversely and then directed downwardly within said cup, said transverse members being adapted to clamp a spray therebetween.

2. A device of the class described including a cup and an element having side legs adapted to be driven into the ground and adapted to be disposed outside of the cup, the material of said element extending from the upper ends of said legs in opposite directions transversely and then directed downwardly within said cup, said transverse members being adapted to clamp a spray therebetween; together with a cross bar uniting said downwardly directed members within the cup.

3. A spray holder having side legs adapted to be driven into the ground, and top members extending in opposite directions from said side legs at the upper ends of the latter and lying in spaced parallel planes, said top members being connected one with the other.

4. In a spray holder of the class described, side legs, members extending transversely from the upper ends of said legs and lying in spaced parallel planes, depending members integral with said transverse members inside of said legs, and a cross bar uniting said depending members at their lower ends.

Signed at Fall River, in the county of Bristol and State of Massachusetts, this seventh day of February, A. D. 1928.

WILLIAM H. CARNOE.